(Model.)

W. N. MILLS.
KNOB ATTACHMENT.

No. 283,134. Patented Aug. 14, 1883.

WITNESSES:
C. Neveux
C. Sedgwick

INVENTOR:
W. N. Mills
BY Munn & Co.
ATTORNEYS.

UNITED STATES PATENT OFFICE.

WILLIAM N. MILLS, OF TRURO, NOVA SCOTIA, CANADA, ASSIGNOR OF ONE-HALF TO ALVIN C. VAN METER, OF SAME PLACE.

KNOB ATTACHMENT.

SPECIFICATION forming part of Letters Patent No. 283,134, dated August 14, 1883.

Application filed December 11, 1882. (Model.)

To all whom it may concern:

Be it known that I, WILLIAM N. MILLS, of Truro, Nova Scotia, Canada, have invented new and useful Improvements in Door-Knobs and their Spindles, of which the following is a full, clear, and exact description.

The invention relates to those door knobs and spindles which are locked together by a pawl-spring and ratchet.

The object of the invention is to facilitate the locking operation and avoid the troublesome application of a screw to hold the pawl in place.

Reference is to be had to the accompanying drawings, forming part of this specification, in which similar letters of reference indicate corresponding parts in both figures.

Figure 1:
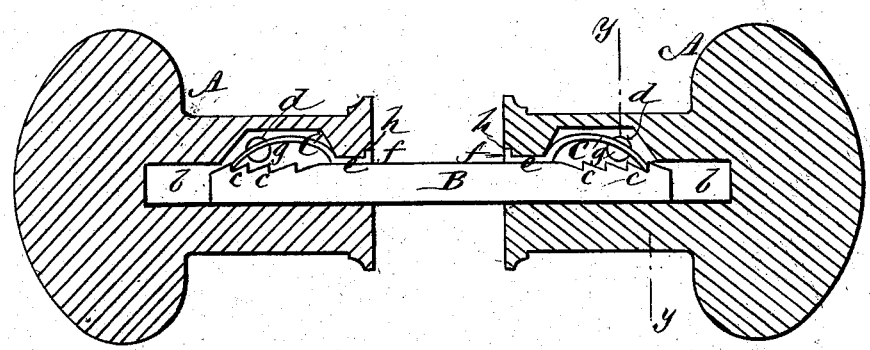
Figure 2:
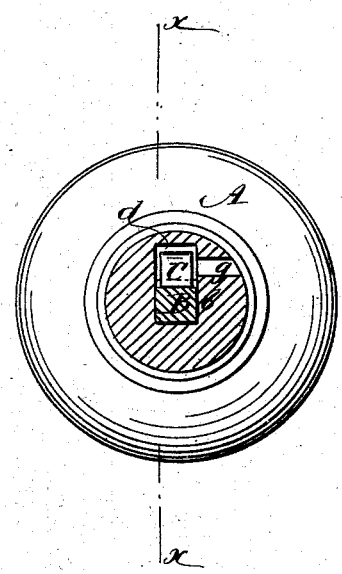

Figure 1 represents a longitudinal section, on the line $x\,x$ in Fig. 2, of a pair of door-knobs as fitted to their spindle, with my invention applied; and Fig. 2, a transverse section on the irregular line $y\,y$ in Fig. 1.

A A in the drawings indicate the door-knobs, each of which is or may be similarly constructed. B is the spindle, and C C the locking-springs or pawls.

The spindle B is of the usual rectangular construction in its transverse section, and the shanks of the knobs have correspondingly-shaped longitudinal recesses $b$ in them, to receive the opposite end portions of the spindle within them, and to provide for the turning of the spindle by the knobs; or said knobs and their spindle may be otherwise constructed, and fitted to provide for the turning of the spindle by the knobs, and of the adjustment of the knobs along the spindle to suit different thicknesses of doors. The knobs A A are engaged with the opposite ends of the spindle B, to hold them in place longitudinally, by constructing the spindle, near its opposite ends, with ratchet or other suitably-shaped teeth, $c$, with which the springs or pawls C C, that are inserted within the shanks of the knobs, engage, as shown in Fig. 1. These pawls it is preferred to make of a bowed spring the acting portion of which is arranged within a chamber, $d$, in the shank of its knob, and which is constructed with a shank, $e$, and lip $f$ at its outer end, arranged to fit through the inner end portion of the shank of the knob next to the spindle and recess $h$, in the face end of the shank, whereby the spring may be readily applied or removed, and be held in place by the knob and spindle.

Either knob A has a transverse aperture, $g$, made in its side, and arranged so as to communicate with the pawl or spring chamber $d$, in such relation to the spring C that it occupies a position to one side of said spring, or a little below it, whereby a key or simple nail may be inserted through said aperture and the spring be prized up or lifted to release it from the teeth $c$ on the spindle whenever it is required to remove the knob, or to adjust it into different locking positions longitudinally on the spindle to suit different thicknesses of door, or as other circumstances may require.

The adjustable connection, just described, of the knobs with the spindle might be applied to only one of the knobs; but it is preferred to apply it to both knobs, as affording a more accurate and extended adjustment.

Having thus described my invention, what I claim as new, and desire to secure by Letters Patent, is—

A pawl-spring for connecting the knobs to the spindle of a door, consisting of the bow-spring C, provided with a shank, $e$, having the lip $f$, to adapt it to be applied to and held between the knob and spindle, as described.

WILLIAM NEILSON MILLS.

Witnesses:
GEORGE GUNN,
WILLIAM GRAHAM.